United States Patent Office 2,971,893
Patented Feb. 14, 1961

2,971,893
PHENOL PURIFICATION

Horace E. Hood, New Castle, Del., assignor to Hercules Powder Company, Wilmington, Del., a corporation of Delaware No Drawing. Filed May 29, 1958, Ser. No. 738,623

8 Claims. (Cl. 202—46)

This invention relates to the purification of phenol, and more particularly to the purification of phenol obtained by oxidation of cumene and subsequent cleavage of the hydroperoxide produced.

When cumene hydroperoxide is cleaved by contacting it with acidic catalysts such as sulfuric acid and acid-treated clays, the cleavage mixture contains phenol and acetone as the principal products. However, the mixture also contains α-methylstyrene, acetophenone, dimethylphenylcarbinol and cumylphenol as by-products, and it may contain some unreacted cumene.

The components of the cleavage mixture are preferably recovered therefrom by fractional distillation. Fundamentally, the distillation results in obtaining an acetone fraction, a phenol fraction and a residue comprising cumylphenol. In more detail, the distillation may be carried out to obtain a first fraction comprising acetone, a second fraction comprising α-methylstyrene, any unreacted cumene, if present, and water, a third fraction comprising phenol, and a residue comprising acetophenone, dimethylphenylcarbinol, cumylphenol and some resinous matter formed by polymerization of α-methylstyrene. Alternatively, the cumene and α-methylsytrene may be collected with the acetone fraction or the phenol fraction and separated therefrom by subsequent distillation. In any event, the phenol fraction is a crude phenol which must be subjected to further distillation for purification purposes.

The distillation procedures described above may be operated batchwise, but are more conveniently carried out on a continuous basis in a series of columns, the various fractions being obtained as overhead materials. The crude phenol fraction so obtained may then be distilled either continuously or in a batchwise operation to purify it. When operating batchwise, the crude phenol is stored and periodically removed from the storage tank for charging to the batch still.

Early in the development of suitable distillation techniques for the isolation of pure phenol from cumene hydroperoxide cleavage mixtures it was found that the product phenol, although otherwise pure and meeting standard specifications, contained certain genetic impurities which were usually present in only minute amounts, but which were of such a nature that the phenol containing them developed an undesired red color when subjected to chlorination with elementary chlorine and also developed an unwanted reddish amber color when sulfonated with concentrated sulfuric acid. These impurities obviously were not separable from the phenol by ordinary fractional distillation, and their presence effectively prevented complete purification of the phenol by this procedure alone.

The nature of the genetic impurities and a process of removing them now have been discovered. The genetic impurities include mesityl oxide, compounds which are α-diketones, such as biacetyl, compounds which are partial hydrogenation products of α-diketones or α-ketoaldehydes, such as acetoin and hydroxyacetone, and compounds which are alkyl-substituted benzofurans, such as 2-methylbenzofuran. The process is one of purification and comprises the particular steps of contacting a phenol, containing the genetic impurities, in the liquid phase with an aqueous alkaline solution of hydrogen peroxide at a temperature in the range of about 0° C. to about 160° C., fractionally steam distilling the treated phenol and subsequently collecting a phenol material which may or may not be the product phenol but which will be a phenol material purified to the extent of substantial removal of the genetic impurities.

Of the specific impurities listed above, mesityl oxide and biacetyl were the first to be identified, and they were found to be inseparable from phenol by ordinary fractional distillation. Identification of the 2-methylbenzofuran impurity was next and was difficult, but after the identification had been accomplished, several additional findings were made, namely, that the compound could not be separated from phenol by ordinary fractional distillation, that it was steam-volatile and separable from phenol by fractional steam distillation, and that it was formed by reaction between phenol and biacetyl, one of the previously known genetic impurities. Furthermore, it was found that biacetyl was not the only precursor to 2-methylbenzofuran, and it also became apparent that there were other alkyl-substituted benzofurans, the alkyl substituents being in the furan ring, which should give rise to undesirable coloration on chlorination of phenol obtained by cumene hydroperoxide cleavage.

The overall findings may now be generalized. Discoloration on chlorination of cumene hydroperoxide phenol occurs primarily due to the presence therein of one or more alkyl-substituted benzofurans, such as 2-methyl-, 3-methyl- and 2-isopropyl-benzofuran. The alkyl-substituted benzofurans are those compounds which are benzofuran substituted by one alkyl substituent in the furan ring, either at the 2- or 3-position. The alkyl group will contain between one and about nine carbon atoms. Ordinarily, six carbon atoms will be a maximum, and most of the substituted benzofurans will contain either one-carbon or three-carbon alkyl substituents. Nevertheless, discoloration also is contributed to by mesityl oxide and one or more of the precursors of the alkyl-substituted benzofurans. These precursors are compounds such as biacetyl, hydroxyacetone, 4-methyl-2,3-pentanedione, and acetoin. In turn, the hydroxyacetone may be formed by partial hydrogenation of methylglyoxal, which is an α-ketoaldehyde, and the 4-methyl-2,3-pentanedione may be formed by hydrogenation of the carbon-carbon double bond in mesityl oxide and oxidation of the resulting methyl isobutyl ketone. Similarly, the acetoin may be formed by partial hydrogenation of biacetyl, which is an α-diketone. The α-diketones and the partial hydrogenation products thereof and of α-ketoaldehydes are all comparatively low molecular weight compounds containing no more than about twelve, and usually no more than about nine, carbon atoms. The α-diketone and α-ketoaldehyde partial hydrogenation products are those wherein one of the keto groups in the diketones and the aldehyde group in the ketoaldehydes have been reduced to the corresponding alcohol groups, thus giving α-ketoalcohols as products.

Accordingly, it is now apparent that the process of this invention is one wherein the alkyl-substituted benzofuran precursors, as well as mesityl oxide, are destroyed by action of the alkaline hydrogen peroxide and wherein the previously formed alkyl-substituted benzofurans are removed by efficient fractional steam distillation.

The purification process of this invention therefore constitutes an improvement in the method for the recovery of phenol by fractional distillation from the mixture produced by cleavage of cumene hydroperoxide, which mixture comprises acetone and phenol as principal components. The improvement comprises the steps of subjecting a cumene hydroperoxide cleavage mixture to fractional distillation to remove acetone and then contacting in the liquid phase any substantially acetone-free, predominantly phenol-containing material, which material contains genetic impurities comprising mesityl oxide, an alkyl-substituted benzofuran, and at least one precursor of said alkyl-substituted benzofuran, with an aqueous alkaline solution of hydrogen peroxide at a temperature in the range of about 0° C. to about 160° C., fractionally steam distilling the treated phenol-containing material, and subsequently collecting a purified phenol-containing material, preferably by fractionally distilling in the absence of water.

In other words, the improvement of this invention involves treatment with the alkaline hydrogen peroxide solution of any predominantly phenol-containing material existing in the distillative recovery system after the acetone has been removed from the cleavage mixture, which itself is not effectively improved by the treatment. The predominantly phenol-containing material may be illustrated by the bottoms product from removal of acetone from the cleavage mixture, by the overhead crude phenol separated from higher boiling materials such as acetophenone and cumylphenol, by the bottoms product from steam distillation of a crude phenol, by the phenol stored prior to final batch distillation, and by the final product phenol isolated by batch or continuous distillation. These are all descriptive of materials obtainable in a substantially continuous distillation system, involving a series of columns, but comparable or related materials obtained by batchwise fractionation also may be treated. All of these materials may be defined as impure phenols to the extent that they contain genetic impurities as hereinbefore described. The purification process preferably comprises heating the impure phenol with the alkaline hydrogen peroxide solution until the mesityl oxide and precursor-type genetic impurities have been completely reacted and converted to products boiling outside the phenol range, and fractionally distilling, first with steam to remove those compounds which per se or in the form of their azeotropes with water have a lower boiling point than phenol, and then in the absence of water until the phenol-containing material is separated from those compounds which boil higher than phenol and remain as undistilled residue.

The process in accordance with this invention is more particularly described in the following examples. In this specification all parts and percentages are by weight.

EXAMPLE 1

Cumene containing about 0.2 mole percent diisopropyl benzene and 0.7 mole percent sec-butyl benzene was oxidized to the hydroperoxide and the hydroperoxide was subjected to acid cleavage. The acid catalyst of the cumene hydroperoxide cleavage mixture was neutralized and the mixture was separated from the products of the neutralization reaction. The mixture then was subjected to fractional distillation, acetone being the first fraction removed. The second fraction contained primarily α-methylstyrene and unreacted cumene and there then was isolated a third fraction which was crude phenol. This crude phenol fraction was subjected to steam distillation to remove overhead azeotropes of water with α-methylstyrene and cumene. The crude phenol bottoms from this distillation contained 2-methylbenzofuran, mesityl oxide and biacetyl. The phenol after ordinary fractional distillation met all specifications for U.S.P. phenol but gave a red color when chlorinated. To 300 parts of this crude phenol was added 1.8 parts hydrogen peroxide in a 30% aqueous solution and 2.4 parts sodium hydroxide in a 40% aqueous solution with good agitation to produce a homogeneous solution. The solution was allowed to stand for 16 hours at 60° C. and was then steam distilled through a distillation column having a partial take-off head using external heating and a pot temperature of 115° C. until 45 parts of water and impurities were collected. The addition of steam was then stopped and the pressure was lowered to 30–40 mm. at which pressure the phenol was distilled.

A sample of the phenol cut was tested according to the chlorination and sulfonation tests set forth hereinafter with a reduction in color as indicated by the reduced absorbance at the various wave lengths as compared with a sample of the phenol similarly distilled but without oxidative treatment and referred to as a blank. Data are set forth in Table 1.

EXAMPLE 2

Example 1 was repeated using 2.4 parts sodium peroxide in a 24% aqueous solution in place of separate solutions of hydrogen peroxide and sodium hydroxide. Within experimental error the results compared favorably with those obtained in Example 1. The absorbance data are set forth in Table 1.

EXAMPLE 3

Example 2 was repeated, using 2.4 parts barium peroxide in 25% aqueous suspension, with improved results over those shown in Example 2 as a comparison of the tabulated absorbance data in Table 1 indicates.

EXAMPLE 4

Example 1 was repeated using 15 parts sodium carbonate in place of aqueous sodium hydroxide along with 1.8 parts hydrogen peroxide in 30% aqueous solution. Compared with the blank in the chlorination color test using Lovibond color for comparison the results were substantially identical to those of Example 1. The data are set forth in Table 1.

EXAMPLE 5

Example 3 was repeated using powdered barium peroxide without the addition of water. The powdered barium peroxide was added gradually with good agitation at about 25° C. The temperature was raised to 60° C. where it was held for 8 hours to allow hydrogen peroxide set free in this step to react with impurities. Then the temperature was raised to 115° C. and steamed until nonphenolic impurities ceased to distill, during which time the aqueous alkaline hydrogen peroxide completed its reaction. The residue was then fractionally distilled and the phenol fraction recovered. The phenol gave the same degree of improvement as was obtained in Example 2 in the chlorination test.

Table 1

| Example | Color on Chlorination | | | | Color on Sulfonation Absorbance 485 mμ |
|---|---|---|---|---|---|
| | Lovibond | Absorbance | | | |
| | | 502 mμ | 510 mμ | 540 mμ | |
| Blank | 7 R, 1 Y | 0.42 | 0.40 | 0.22 | 7.4 |
| 1 | 1 R, 0.5 Y | 0.13 | 0.12 | 0.05 | 1.9 |
| 2 | | 0.12 | 0.11 | 0.04 | 1.8 |
| 3 | | 0.07 | 0.06 | 0.03 | 1.0 |
| 4 | 1 R, 0.5 Y | | | | |
| 5 | | 0.13 | 0.11 | 0.05 | |

The effect of 2-methylbenzofuran, biacetyl and mesityl oxide upon the color of phenol which has been chlorinated is shown in the next example.

EXAMPLE 6

To samples of substantially pure phenol (Merck) were added varying amounts of mesityl oxide, biacetyl and 2-methylbenzofuran (2-MBF), and the resulting mixtures were chlorinated according to the chlorination test set forth hereinafter. A sample of the pure phenol was similarly chlorinated for comparative purposes. The data obtained are given in Table 2.

Table 2

| Sample | Color on Chlorination Absorbance | |
|---|---|---|
| | 510 mμ | 540 mμ |
| Phenol | 0.28 | 0.10 |
| Phenol+0.1% Mesityl Oxide | 1.2 | |
| Phenol+0.2% Mesityl Oxide | 2.8 | |
| Phenol+0.1% Biacetyl | 11.7 | |
| Phenol+0.016% 2-MBF | | 7.3 |
| Phenol+0.018% 2-MBF | | 9.7 |
| Phenol+0.022% 2-MBF | | 12.6 |
| Phenol+0.028% 2-MBF | | 14.8 |
| Phenol+0.034% 2-MBF | | 15.8 |
| Phenol+0.05% 2-MBF | | 22.8 |

The above data established that each of the impurities has a profound effect on the color of chlorinated phenol. Both mesityl oxide and biacetyl cause a bright red coloration with a characteristic absorption at 510 mμ. 2-methylbenzofuran is responsible for a reddish purple color with absorption at 540 mμ, and it and biacetyl are relatively potent color-formers, imparting intense coloration in low concentrations. By comparison, mesityl oxide causes considerably less coloration.

The next example establishes the applicability of the process of this invention to process streams other than that used in Examples 1–5. It also shows the necessity of using efficient fractional steam distillation subsequent to the treatment with alkaline hydrogen peroxide.

EXAMPLE 7

A cumene hydroperoxide cleavage mixture which had been neutralized and separated from the products of the neutralization reaction was subjected to fractional distillation in a series of columns. In the first column acetone was taken overhead, leaving as bottoms product (A) a mixture of phenol, some cumene and α-methylstyrene, and high boiling material composed primarily of acetophenone, dimethylphenylcarbinol and cumylphenol. This bottoms product was separated in the next column into an overhead crude phenol fraction (B) and a high boiling residue. The crude phenol fraction was then subjected to steam distillation in a third column to remove overhead azeotropes of water with α-methylstyrene and cumene, and left a crude phenol bottoms product (C) which was transferred to a steel storage container. The stored phenol (D) from this container was distilled batchwise to recover product phenol.

Samples of bottoms product (A), crude phenol fraction (B) and stored phenol (D) were treated with aqueous 30% hydrogen peroxide and aqueous 40% sodium hydroxide, the amount of each of these reagents being two parts/100 parts of each sample being treated. The resulting solutions were held at 60° C. for 16 hours, after which each sample solution was separated into two equal portions. One of these was subjected to ordinary batch fractional distillation, with the charge being added to the still pot. The other portion of each sample solution was fractionally steam distilled using a modified inverted batch still technique, in which distilled water was charged to the still pot and brought to reflux, and then the sample solution was pumped continuously into the top of the still while maintaining water reflux. Thus, all of the phenol was contacted with steam as it flowed down and across all of the trays of the column. After all the charge had been added, distillation was carried out in the normal manner.

The phenol obtained from each distillation was chlorinated according to the chlorination test set forth hereinafter. The data obtained are given in Table 3.

Table 3

| Material Treated | Distillation Technique | Color on Chlorination—Absorbance at 540 mμ |
|---|---|---|
| Bottoms Product (A) | Ordinary | 19.9 |
| | Steam | 3.5 |
| Crude Phenol Fraction (B) | Ordinary | 15.2 |
| | Steam | 2.6 |
| Stored Phenol (D) | Ordinary | .73 |
| | Steam | .41 |

When the alkaline hydrogen peroxide treatment and distillations described in this example were applied to the cleavage mixture, unsatisfactory phenol was obtained. Ordinary distillation gave a bright yellow product having a chlorination color at 540 mμ greater than 33, and steam distillation resulted in a similarly colored product having a chlorination color of 12 at 540 mμ.

The amount of alkaline hydrogen peroxide to use in the process of this invention for any particular batch of phenol may be determined empirically using the following color tests for determining whether the mesityl oxide and precursor-type genetic impurities have been removed. There is used an amount sufficient to remove substantially all of these impurities, which give a red color when the phenol is subjected to chlorination in the chlorination color test and which give a reddish amber color when the phenol is sulfonated in the sulfonation color test. Up to about 5 parts hydrogen peroxide (100% basis) per 100 parts phenol usually is sufficient, along with enough alkali to produce an alkaline solution, to achieve this result.

Chlorination color test.—10±0.1 g. phenol to be tested is placed in a chlorination vessel comprising a 25 mm. test tube fitted with a gas inlet tube extending to the bottom of the test tube, a gas outlet tube opening from the upper end of the test tube, and a glass stopper for introduction of the phenol. Chlorine gas is introduced through the gas inlet tube at a rate of one liter per minute while maintaining a reaction temperature at 88°±5° C. by cooling of the chlorination vessel. The chlorination vessel is weighed from time to time and chlorination is stopped when a gain in weight of 5.5–6.0 grams is noted. The chlorinated product is then transferred to a 1 cm. cell and subjected to analysis by a recording spectrophotometer. The absorption at 510 and 540 mμ is noted for test purposes and the position of maximum absorption is also noted. Absorbance is a measurement of the intensity of absorption and is defined as the log of the reciprocal of the transmittance. The color of the chlorinated phenol in a 1 cm. cell is alternatively analyzed by Lovibond color units.

Sulfonation color test.—10±0.1 g. phenol to be tested is placed in a sulfonation vessel and heated until molten. To the phenol is added 5 g. of concentrated sulfuric acid, and the resulting mixture is heated with stirring to 150° C. and held at that temperature for 5 minutes. The sulfonated phenol is then cooled and transferred to a 1 cm. cell and subjected to analysis by a recording spectrophotometer. The absorption at 485 mμ is noted for test purposes.

The alkaline solution of hydrogen peroxide used in the purification treatment may be produced by adding an alkali metal hydroxide or alkaline earth metal hydroxide or oxide to an aqueous hydrogen peroxide solution, by adding hydrogen peroxide to an aqueous solution of an alkali metal hydroxide or alkaline earth metal hydroxide or oxide, or by mixing an alkali metal or alkaline earth metal peroxide with water. An excess over the chemically equivalent amount of either the metal hydroxide or the hydrogen peroxide may be used. However, a suitable solution is most conveniently formed by combining an alkali metal peroxide or alkaline earth metal peroxide and water, whereby the reagents are formed in equivalent amounts. The common alkali metal hydroxides such as sodium hydroxide and potassium hydroxide, and the common alkaline earth metal hydroxides such as calcium hydroxide and barium hydroxide are preferred. Sodium and potassium carbonates are functionally equivalent to the hydroxides in the process of this invention when they are heated at elevated temperature with phenol.

The amount of water used in the process is not critical, since it does not appear to enter into the reaction. Ordinarily a 30% solution of hydrogen peroxide and a 40% solution of alkali or alkaline earth metal hydroxide may be combined to form a satisfactory concentrated aqueous alkaline solution of hydrogen peroxide for use in the purification process. Likewise, the aqueous alkaline solution of hydrogen peroxide may be produced in situ from alkali or alkaline earth metal peroxides and the requisite amount of water for hydrolysis thereof. As shown by Example 5 using powdered barium peroxide, the required amount of water may be furnished by the small amount usually present in the phenol itself. However, caution should be exercised when following this procedure with solid sodium peroxide, since an insufficient amount of water may result in an exothermic reaction. Moreover, the reaction period may be combined with the steam distillation period so that the water in the system is provided by the steam. On the other hand, a fairly dilute alkaline solution of hydrogen peroxide may be used and the amount of water in that case may produce either a heterogeneous or a homogeneous mixture with the phenol. When a heterogeneous system is created, good agitation is desired. Since water introduced in the treatment must be subsequently removed, it is preferable to use a concentrated aqueous alkaline solution of hydrogen peroxide of concentration from about 20–40%.

The temperature of reaction may be anywhere from about 0° C. to about 160° C., a longer time being required at 0° C. than at 160° C. At about 60° C. the reaction takes about 8 hours. A preferred temperature range is from about 25° C. to about 125° C. The pretreatment may be carried out at the same temperature as the steam distillation with good results.

The reaction period may be combined with the steam distillation if desired and those compounds which per se or in the form of their azeotropes with water have a lower boiling point than phenol may be separated during the reaction until no more such compounds distill over. If the reaction period precedes the steam distillation, these low boiling compounds or water azeotropes are similarly distilled off prior to continuing the distillation in the absence of water to collect a purified phenol-containing material. The chief difference between effecting the reaction first and combining the reaction with the steam distillation is that in the latter a longer period is required for removal of the forerun since the compounds comprising the forerun are produced in part by the reaction taking place during the steam distilling step.

The fractional steam distillation step of this invention, whether carried out subsequent to or combined with the period of reaction involving the alkaline hydrogen peroxide, must be operated with sufficient efficiency that the alkyl-substituted benzofurans such as 2-methylbenzofuran are substantially removed from the predominantly phenol-containing material. It is preferred that after the steam distillation the phenol-containing material will contain an amount of alkyl-substituted benzofuran corresponding to a content of 2-methylbenzofuran not exceeding about 50 parts per million, corresponding approximately to a chlorination color of about 3.0 at 540 m$\mu$. This can be accomplished by carrying out the distillation continuously in an efficient column, for example, one having 20–40 plates, or in a comparable column using the modified inverted batch technique described in Example 7. Ordinary batch steam distillation is comparatively ineffective.

The phenol-containing material from the steam distillation step then is preferably subjected to fractional distillation in the absence of water to collect a purified material which is free or substantially free of compounds which boil higher than phenol and remain as undistilled residue. For example, if the purified phenol is that obtained by applying the process of this invention to the bottoms product from removal of acetone from the cleavage mixture, the undistilled residue will principally comprise acetophenone, dimethylphenylcarbinol and cumylphenol. However, the purified phenol may contain, for example, some acetophenone and thus require further distillation to isolate a truly pure phenol. Some water also may be present, this also necessitating redistillation to remove last traces thereof so as to meet U.S.P specifications in this respect. However, it is apparent that the phenol can be recovered, subsequent to the steam distillation step, by other procedures, such as extraction with aqueous alkali.

While the phenol to be purified by the process of this invention may contain from traces to comparatively large amounts of mesityl oxide, an alkyl-substituted benzofuran and one or more precursors of said alkyl-substituted benzofurans, the process is generally reserved for phenol containing no more mesityl oxide and the precursor-type impurities than are removed by the use of up to about 5% hydrogen peroxide (100% basis) and an equivalent of alkali. This limitation is based on economic factors rather than on effectiveness of the process and does not constitute a limitation to the process.

This application constitutes a continuation-in-part of my application for United States Letters Patent, Serial No. 589,344, filed June 4, 1956, now abandoned.

What I claim and desire to protect by Letters Patent is:

1. In the method for the recovery of phenol from a cumene hydroperoxide cleavage mixture by fractional distillation, said mixture comprising phenol and acetone as principal components, the improvement which comprises the steps of subjecting said mixture to fractional distillation to remove acetone and then contacting in the liquid phase any substantially acetone-free, predominantly phenol-containing material, which material contains genetic impurities comprising mesityl oxide, an alkyl-substituted benzofuran, and at least one precursor of said alkyl-substituted benzofuran, these precursors comprising at least one member selected from the group consisting of an α-diketone, an α-ketoalcohol formed by partial hydrogenation of an α-diketone and an α-ketoalcohol formed by partial hydrogenation of an α-ketoaldehyde, with an aqueous alkaline solution of hydrogen peroxide at a temperature in the range of about 0° C. to about 160° C., until the mesityl oxide and precursor-type genetic impurity have been substantially completely reacted and converted to products boiling outside the phenol range, fractionally steam distilling the treated phenol-containing material until alkyl-substituted benzofuran has been substantially removed from said material and subsequently collecting a purified phenol-containing material.

2. The method of claim 1 in which the purifed phenol-containing material is collected by fractional distillation in the absence of water to obtain a purified phenol fraction.

3. The method of claim 1 in which the aqueous alkaline solution of hydrogen peroxide comprises an aqueous solution of hydrogen peroxide containing sodium hydroxide.

4. The method of claim 1 in which the aqueous alkaline solution of hydrogen peroxide comprises an aqueous solution of hydrogen peroxide containing potassium hydroxide.

5. The method of claim 1 in which the aqueous alkaline solution of hydrogen peroxide comprises an aqueous solution of hydrogen peroxide containing calcium hydroxide.

6. The method of claim 1 in which the aqueous alkaline solution of hydrogen peroxide comprises an aqueous solution of hydrogen peroxide containing barium hydroxide.

7. The method of claim 1 in which the aqueous alkaline solution of hydrogen peroxide comprises the reaction product of sodium peroxide and water.

8. The method of claim 1 in which the aqueous alkaline solution of hydrogen peroxide comprises the reaction product of barium peroxide and water.

References Cited in the file of this patent

UNITED STATES PATENTS

| | | |
|---|---|---|
| 2,150,656 | Lounsbury | Mar. 14, 1939 |
| 2,628,983 | Aller et al. | Feb. 17, 1953 |
| 2,737,480 | Adams et al. | Mar. 6, 1956 |

FOREIGN PATENTS

| | | |
|---|---|---|
| 355,573 | Great Britain | Aug. 27, 1931 |
| 729,377 | Great Britain | May 4, 1955 |
| 751,325 | Germany | Dec. 8, 1952 |

UNITED STATES PATENT OFFICE
CERTIFICATION OF CORRECTION

Patent No. 2,971,893                      February 14, 1961

Horace E. Hood

It is hereby certified that error appears in the above numbered patent requiring correction and that the said Letters Patent should read as corrected below.

Column 6, line 40, for "88°" read -- 80° --.

Signed and sealed this 27th day of June 1961.

(SEAL)
Attest:

ERNEST W. SWIDER                      DAVID L. LADD
Attesting Officer                      Commissioner of Patents